(12) United States Patent
Yamamoto et al.

(10) Patent No.: US 10,786,778 B2
(45) Date of Patent: Sep. 29, 2020

(54) POWER SUPPLY CONTROL DEVICE OF NITROGEN GAS GENERATOR

(71) Applicant: SYSTEM INSTRUMENTS CO., LTD., Hachioji-shi, Tokyo (JP)

(72) Inventors: Kiyoshi Yamamoto, Tokyo (JP); Yoshihisa Ujima, Tokyo (JP); Takeshi Akiba, Tokyo (JP)

(73) Assignee: SYSTEM INSTRUMENTS CO., LTD., Tokyo (JP)

( * ) Notice: Subject to any disclaimer, the term of this patent is extended or adjusted under 35 U.S.C. 154(b) by 231 days.

(21) Appl. No.: 15/781,545

(22) PCT Filed: Jan. 15, 2016

(86) PCT No.: PCT/JP2016/051110
§ 371 (c)(1),
(2) Date: Jun. 5, 2018

(87) PCT Pub. No.: WO2017/122342
PCT Pub. Date: Jul. 20, 2017

(65) Prior Publication Data
US 2018/0353897 A1 Dec. 13, 2018

(51) Int. Cl.
*B01D 53/02* (2006.01)
*B01D 53/22* (2006.01)
(Continued)

(52) U.S. Cl.
CPC .......... *B01D 53/22* (2013.01); *B01D 53/229* (2013.01); *C01B 21/04* (2013.01); *F04B 49/02* (2013.01);
(Continued)

(58) Field of Classification Search
CPC ............ B01D 2256/10; B01D 2257/80; B01D 2259/45; B01D 53/22; B01D 53/229;
(Continued)

(56) References Cited

U.S. PATENT DOCUMENTS

2004/0231510 A1* 11/2004 Nakamura ............. B01D 53/02
95/96
2007/0151454 A1* 7/2007 Marwitz .............. B01D 53/229
96/7

(Continued)

FOREIGN PATENT DOCUMENTS

JP S64-065008 A 3/1989
JP 2001-219024 A 8/2001
(Continued)

OTHER PUBLICATIONS

Translation of JP-2001263087; Nagata (Year: 2001).*
(Continued)

*Primary Examiner* — Christopher P Jones
(74) *Attorney, Agent, or Firm* — Oliff PLC

(57) ABSTRACT

A power supply control device of a nitrogen gas generator includes: a pipe having a nitrogen gas inlet for receiving input of nitrogen gas from a nitrogen gas generator that compresses air by a compressor to separate the nitrogen gas from the air, and a nitrogen gas outlet for outputting, to outside, the nitrogen gas received by the nitrogen gas inlet; a pressure gauge that measures pressure inside the pipe; a flowmeter that measures a flow rate of the nitrogen gas flowing inside the pipe; and a control unit that controls supply of power to the compressor and shut-off of the supply of the power in accordance with a measurement result of at least one of the pressure gauge and the flowmeter.

10 Claims, 7 Drawing Sheets

(51) Int. Cl.
    *C01B 21/04*     (2006.01)
    *F04B 49/02*     (2006.01)
    *F04B 49/06*     (2006.01)
    *G01F 1/20*     (2006.01)
    *F17D 1/04*     (2006.01)
    *F17D 3/01*     (2006.01)

(52) U.S. Cl.
CPC ............ *F04B 49/06* (2013.01); *F04B 49/065* (2013.01); *G01F 1/206* (2013.01); *B01D 2256/10* (2013.01); *B01D 2257/80* (2013.01); *B01D 2259/45* (2013.01); *C01B 2210/0048* (2013.01); *F04B 2205/05* (2013.01); *F04B 2205/09* (2013.01); *F17D 1/04* (2013.01); *F17D 3/01* (2013.01)

(58) Field of Classification Search
CPC ........ F04B 49/02; F04B 49/06; F04B 49/065; G01F 1/206
See application file for complete search history.

(56) References Cited

U.S. PATENT DOCUMENTS

| | | | | |
|---|---|---|---|---|
| 2012/0024324 | A1* | 2/2012 | Force | B01J 20/3483 |
| | | | | 134/31 |
| 2012/0145417 | A1* | 6/2012 | Anselm | B01D 53/0476 |
| | | | | 169/45 |
| 2014/0326139 | A1* | 11/2014 | Kokubu | B01D 53/047 |
| | | | | 95/96 |
| 2015/0323411 | A1* | 11/2015 | Eberlein | G01M 3/3263 |
| | | | | 73/40 |
| 2016/0361684 | A1* | 12/2016 | Ranjan | B01D 53/30 |
| 2017/0216764 | A1* | 8/2017 | Garfinkle | B01D 53/22 |
| 2017/0297888 | A1* | 10/2017 | Kleinrichert | B67D 1/0406 |

FOREIGN PATENT DOCUMENTS

| | | | |
|---|---|---|---|
| JP | 2001263087 A | * | 9/2001 |
| JP | 2002-045635 A | | 2/2002 |

OTHER PUBLICATIONS

Jul. 17, 2018 International Preliminary Report on Patentability issued in International Patent Application No. PCT/JP2016/051110.
Mar. 8, 2016 International Search Report issued in Patent Application No. PCT/JP2016/051110.

* cited by examiner

POWER SUPPLY CONTROL DEVICE OF NITROGEN GAS GENERATOR

FIELD

The present invention relates to a power supply control device of a nitrogen gas generator.

BACKGROUND

PTL 1 discloses a nitrogen gas generator. The nitrogen gas generator compresses air by a compressor to separate nitrogen gas from the air. The compressor needs to be periodically maintained in order to satisfy its original specifications.

CITATION LIST

Patent Literature

[PTL 1] JP 2001-219024 A

SUMMARY

Technical Problem

The maintenance of the compressor is performed on the basis of the accumulated operating time of the compressor. Therefore, when the nitrogen gas generator is operated at the time of non-use of nitrogen gas, time until the maintenance of the compressor is required is shortened.

The present invention has been made in order to solve the above problem. An object of the present invention is to provide a power supply control device of a nitrogen gas generator, capable of prolonging time until maintenance of a compressor is required.

Solution to Problem

A power supply control device of nitrogen gas generator according to the present invention includes: a pipe having a nitrogen gas inlet for receiving input of nitrogen gas from a nitrogen gas generator that compresses air by a compressor to separate the nitrogen gas from the air, and a nitrogen gas outlet for outputting, to outside, the nitrogen gas received by the nitrogen gas inlet; a pressure gauge that measures pressure inside the pipe; a flowmeter that measures a flow rate of the nitrogen gas flowing inside the pipe; and a control unit that controls supply of power to the compressor and shut-off of the supply of the power in accordance with a measurement result of at least one of the pressure gauge and the flowmeter.

Advantageous Effects of Invention

According to the present invention, the supply of the power to the compressor, and shut-off of the supply of the power are controlled in accordance with the measurement result of at least one of the pressure gauge and the flowmeter. Therefore, it is possible to prolong time until maintenance of the compressor is required.

DESCRIPTION OF EMBODIMENTS

Figure 1:
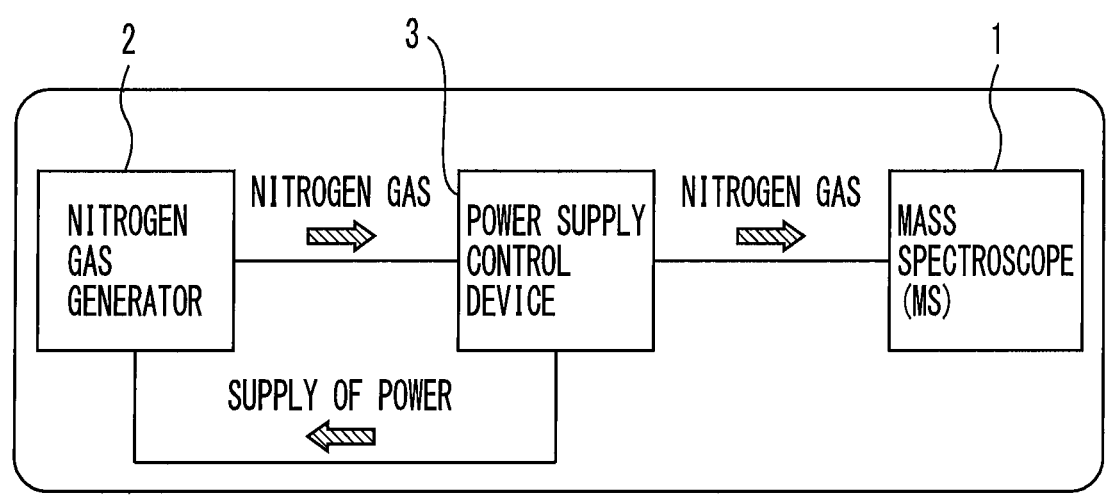
FIG. 1 is a system configuration diagram to which a power supply control device of a nitrogen gas generator according to Embodiment 1 of the present invention is applied.

Embodiments for carrying out the present invention will be described with reference to the attached drawings. In the respective drawings, the same or equivalent parts are denoted by the same reference numerals. The overlapping description of the parts will be suitably simplified or omitted.

Embodiment 1

FIG. 1 is a system configuration diagram to which a power supply control device of a nitrogen gas generator according to Embodiment 1 of the present invention is applied.

In FIG. 1, a mass spectroscope 1 ionizes a substance. The mass spectroscope 1 separates ions. In the mass spectroscope 1, a detector detects the number (intensity) of ions in a mass-charge ratio (m/z) by the separated ions. The mass spectroscope 1 performs qualitative and quantitative analyses on the basis of a detection result of the detector.

The mass spectroscope 1 is used in combination with chromatography for isolating a substance. For example, the mass spectroscope 1 is an LC-MS using liquid. For example, the mass spectroscope 1 is a GC-MS using gas.

As a method for ionizing a substance (solution) in the LC-MS, a method collectively called an atmospheric pressure ionization (API: atmospheric pressure ionization) method is used. For example, an electrospray ionization (ESI: electrospray ionization) method is used. For example, an atmospheric pressure chemical ionization (APCI: atmospheric pressure chemical ionization) method is used.

A nitrogen gas generator 2 generates nitrogen gas used when the mass spectroscope 1 ionizes a substance. Nitrogen gas is inert. Therefore, nitrogen gas avoids unnecessary reaction in ionization. Examples of a condition required for nitrogen gas include high purity, dry, stable constant pressure, a stable constant flow rate.

When the purity of nitrogen gas is low, or nitrogen gas contains moisture, normal ionization is not performed, and a result of analysis becomes abnormal. Even when the pressure or the flow rate of a simple gas becomes unstable, the result of analysis becomes abnormal similarly.

A power supply control device 3 controls supply of power to the nitrogen gas generator 2 and shut-off of the supply of power in accordance with of a condition of use of nitrogen gas by the mass spectroscope 1.

Now, a nitrogen gas generator 2 will be described with reference to FIG. 2.

Figure 2:
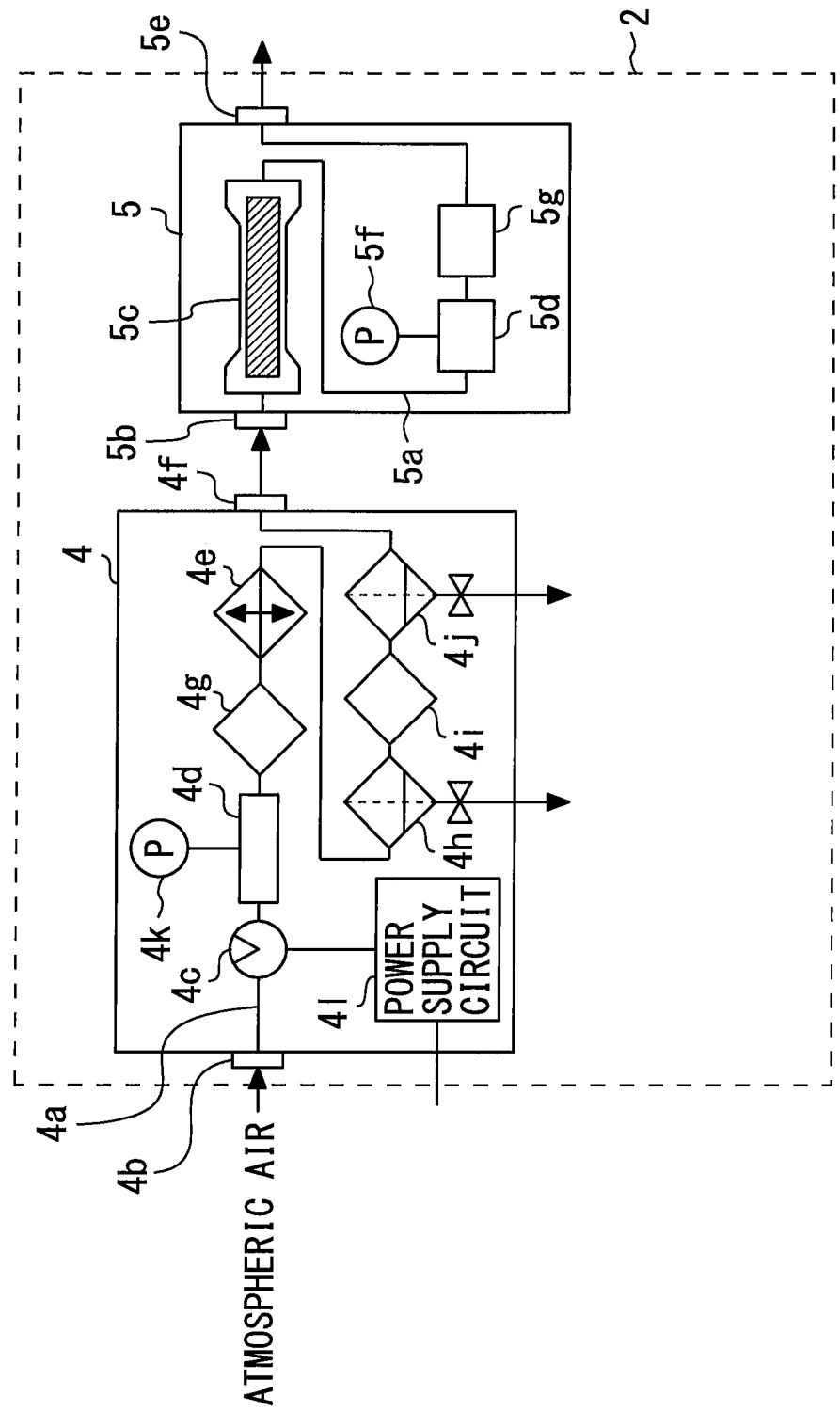
FIG. 2 is a configuration diagram of a nitrogen gas generator to which the power supply control device of a nitrogen gas generator according to Embodiment 1 of the present invention is applied.

FIG. 2 is a configuration diagram of the nitrogen gas generator to which the power supply control device of a nitrogen gas generator according to Embodiment 1 of the present invention is applied.

As illustrated in FIG. 2, the nitrogen gas generator 2 includes a compressed air generator 4, and a nitrogen gas separator 5.

For example, the compressed air generator 4 includes a pipe 4a, an atmospheric air inlet 4b, a compressor 4c, an air tank 4d, a gas cooler 4e, and a compressed air outlet 4f.

The pipe 4a is cylindrically formed. The atmospheric air inlet 4b is formed on the inlet side of the pipe 4a. The compressor 4c is provided on a flow passage of the pipe 4a on a downstream side with respect to the atmospheric air inlet 4b. The air tank 4d is provided on a flow passage of the pipe 4a on the downstream side with respect to the compressor 4c. The gas cooler 4e is provided on a flow passage of the pipe 4a on the downstream side with the air tank 4d. The compressed air outlet 4f is formed on the outlet side of the pipe 4a. The compressed air outlet 4f is provided on the outlet side of the pipe 4a on the downstream side with the gas cooler 4e.

The atmospheric air inlet 4b receives input of atmospheric air. The compressor 4c generates high-temperature and high-pressure compressed air from the atmospheric air input from the atmospheric air inlet 4b. The air tank 4d stores the compressed air generated by the compressor 4c. The gas cooler 4e cools the compressed air. At this time, drain water is generated as drops of water. The compressed air outlet 4f outputs the compressed air.

For example, the compressed air generator 4 includes a first air filter 4g, a second air filter 4h, an activated carbon filter 4i, and a micromist filter 4j.

The first air filter 4g is provided on a flow passage of the pipe 4a between the air tank 4d and the gas cooler 4e. The second air filter 4h is provided on a flow passage of the pipe 4a between the gas cooler 4e and the compressed air outlet 4f. The activated carbon filter 4i is provided on a flow passage of the pipe 4a between the second air filter 4h and the compressed air outlet 4f. The micromist filter 4j is provided on a flow passage of the pipe 4a between the activated carbon filter 4i and the compressed air outlet 4f.

The first air filter 4g, the second air filter 4h, the activated carbon filter 4i, and the micromist filter 4j remove water, oil, foreign matters, and the like contained in compressed air.

For example, the compressed air generator 4 includes a pressure sensor 4k, and a power supply circuit 4l.

The pressure sensor 4k is provided in the air tank 4d. The input side of the power supply circuit 4l is connected to the output side of a power supply of the power supply control device 3 (not illustrated in FIG. 2). The output side of the power supply circuit 4l is connected to the input side of the compressor 4c.

The pressure sensor 4k detects the pressure inside the air tank 4d. The power supply circuit 4l receives input of power supply from the power supply control device 3 (not illustrated in FIG. 2) to generate driving power supply of the compressor 4c.

A safety valve for extracting compressed gas by operating when the pressure on the discharge side of the compressor 4c becomes abnormally high may be provided. In a case where the pressure inside the air tank 4d reaches a predetermined upper limit value, the compressor 4c may automatically stop operation.

For example, the nitrogen gas separator 5 includes a pipe 5a, a compressed air inlet 5b, a nitrogen separation film 5c, a nitrogen gas regulator 5d, and a nitrogen gas outlet 5e.

The pipe 5a is cylindrically formed. The compressed air inlet 5b is provided on the inlet of the pipe 5a. The compressed air inlet 5b is provided on the downstream side of the compressed air outlet 4f of the compressed air generator 4. The nitrogen separation film 5c is provided on a flow passage of the pipe 5a on a downstream side with respect to the compressed air inlet 5b. The nitrogen gas regulator 5d is provided on a flow passage of the pipe 5a on the downstream side with respect to the nitrogen separation film 5c. The nitrogen gas outlet 5e is provided on the outlet side of the pipe 5a on the downstream side with the nitrogen gas regulator 5d.

The compressed air inlet 5b receives the compressed air from the compressed air outlet 4f of the compressed air generator 4. The nitrogen separation film 5c separates nitrogen gas from the compressed air. The nitrogen gas regulator 5d stabilizes the pressure of the nitrogen gas. The nitrogen gas outlet 5e outputs the nitrogen gas.

For example, the nitrogen gas separator 5 includes a pressure gauge 5f, and a flowmeter 5g.

The pressure gauge 5f is provided in the nitrogen gas regulator 5d. The flowmeter 5g is provided on a flow passage of the pipe 5a on the downstream side of the nitrogen gas regulator 5d.

The pressure gauge 5f measures and displays the pressure value of the nitrogen gas. The flowmeter 5g measures the flow rate of the nitrogen gas that flows inside the pipe 5a.

Now, the power supply control device 3 will be described with reference to FIG. 3.

Figure 3:
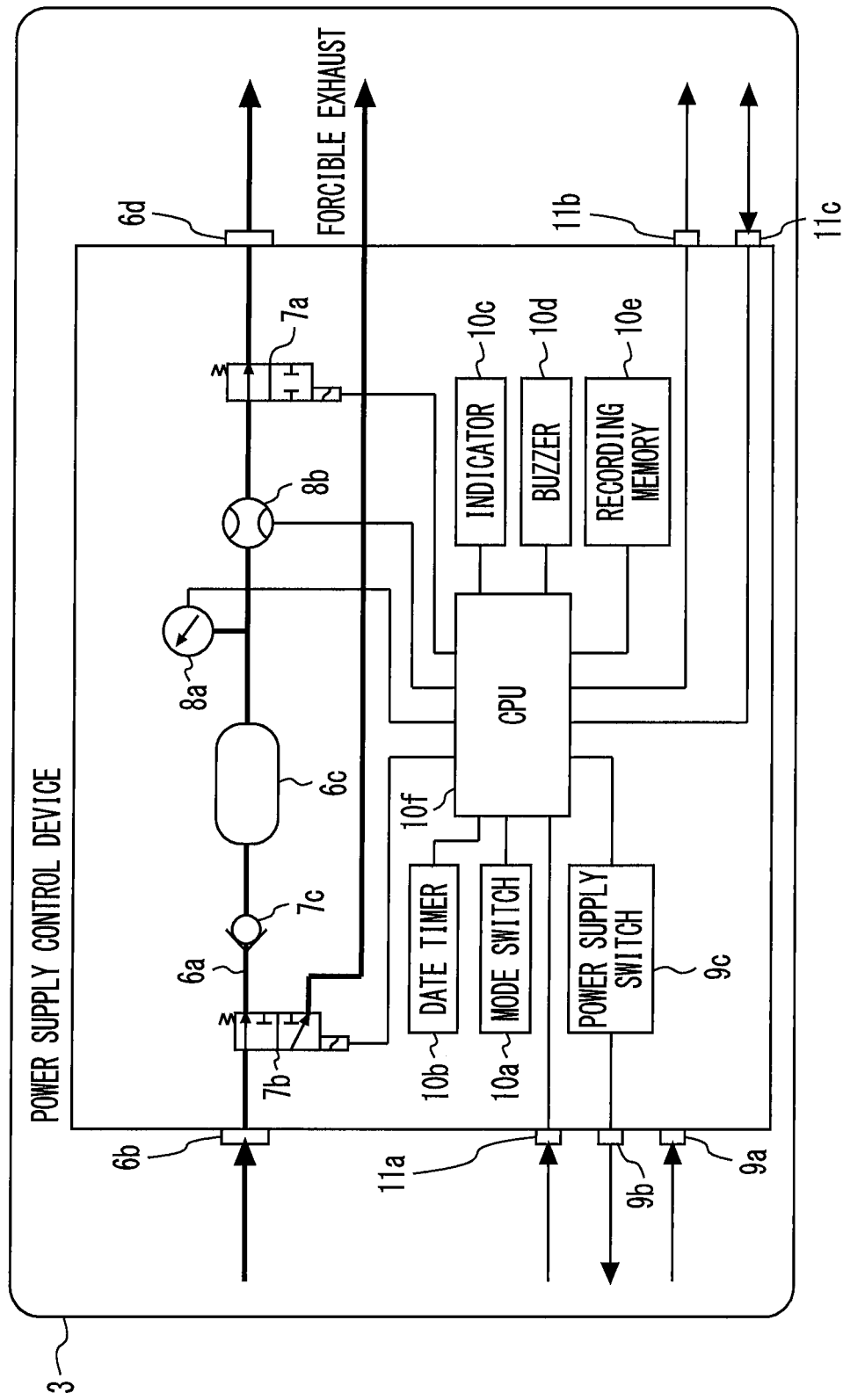
FIG. 3 is a configuration diagram of the power supply control device of a nitrogen gas generator according to Embodiment 1 of the present invention.

FIG. 3 is a configuration diagram of the power supply control device of a nitrogen gas generator according to Embodiment 1 of the present invention.

For example, the power supply control device 3 includes a pipe 6a, a nitrogen gas inlet 6b, a nitrogen gas tank 6c, and a nitrogen gas outlet 6d.

The pipe 6a is cylindrically formed. The nitrogen gas inlet 6b is formed on the inlet side of the pipe 6a. The nitrogen gas inlet 6b is provided on the downstream side of the nitrogen gas outlet 5e of the nitrogen gas separator 5. The nitrogen gas tank 6c is provided on a flow passage of the pipe 6a on the downstream side with respect to the nitrogen gas inlet 6b. The nitrogen gas outlet 6d is provided on the outlet side of the pipe 6a with respect to the nitrogen gas tank 6c. The nitrogen gas outlet 6d is connected to the inlet side of the mass spectroscope 1.

The nitrogen gas inlet 6b receives input of the nitrogen gas from the nitrogen gas outlet 5e of the nitrogen gas separator 5. The nitrogen gas tank 6c delays lowering of the pressure inside the pipe 6a. The nitrogen gas outlet 6d outputs the nitrogen gas toward the mass spectroscope 1.

For example, the power supply control device 3 includes a control valve 7a, a reducing valve 7b, and a check valve 7c.

The control valve 7a is provided on a flow passage of the pipe 6a between the nitrogen gas tank 6c and the nitrogen gas outlet 6d. The reducing valve 7b is provided on a flow passage of the pipe 6a between the nitrogen gas inlet 6b and the nitrogen gas tank 6c. The check valve 7c is provided on a flow passage of the pipe 6a between the reducing valve 7b and the nitrogen gas tank 6c.

The control valve 7a controls output of the nitrogen gas from the nitrogen gas outlet 6d. The reducing valve 7b is used when nitrogen gas inside a flow passage from the nitrogen gas generator 2 to the nitrogen gas inlet 6b is forcibly exhausted. The check valve 7c suppresses lowering of the pressure from the nitrogen gas tank 6c to the nitrogen gas outlet 6d when the nitrogen gas inside the flow passage for nitrogen gas from the nitrogen gas generator 2 to the nitrogen gas inlet 6b is forcibly exhausted by the reducing valve 7b.

For example, the power supply control device 3 includes a pressure gauge 8a, and a flowmeter 8b.

The pressure gauge 8a is connected to the pipe 6a between the nitrogen gas tank 6c and the control valve 7a. The flowmeter 8b is provided on a flow passage of the pipe 6a between the nitrogen gas tank 6c and the control valve 7a.

The pressure gauge 8a measures the pressure inside the pipe 6a. The flowmeter 8b measures the flow rate of nitrogen gas that flows inside the pipe 6a.

For example, the power supply control device 3 includes a power supply input unit 9a, a power supply output unit 9b, and a power supply switch 9c.

The power supply input unit 9a receives power supply from an external power supply to the power supply control device 3. The power supply output unit 9b can supply, to the power supply circuit 4l of the compressed air generator 4, power obtained from the power supply input unit 9. In a case where power is on, the power supply switch 9c maintains supply of power from the power supply output unit 9b to the power supply circuit 4l of the compressed air generator 4. In a case where power is off, the power supply switch 9c shuts off supply of power from the power supply output unit 9b to the power supply circuit 4l of the compressed air generator 4.

For example, the power supply control device 3 includes a mode switch 10a, a date timer 10b, an indicator 10c, a buzzer 10d, a recording memory 10e, and a CPU 10f.

The mode switch 10a receives external operation. The date timer 10b can grasp date and time. The indicator 10c performs display indicating an operating condition of the power supply control device 3. For example, the indicator 10c performs display indicating a power supply state of the power supply control device 3. For example, the indicator 10c performs display indicating a state of the power supply switch 9c. The buzzer 10d indicates the operating condition of the power supply control device 3 by sound in cooperation with the indicator 10c. The recording memory 10e is a nonvolatile memory. The recording memory 10e records the information of the operating condition of the power supply control device 3. The CPU 10f controls the whole of the power supply control device 3.

For example, the power supply control device 3 includes an external signal input unit 11a, an external signal output unit 11b, and an external communication unit 11c.

The external signal input unit 11a receives input of a signal from an external device. The external signal output unit 11b outputs the signal to the external device. For example, the external signal output unit 11b outputs a signal corresponding to an operating condition of the power supply control device 3. The external communication unit 11c is used at the time of communication with the external device. For example, the external communication unit 11c is used when information recorded in the recording memory 10e is transferred. For example, the external communication unit 11c is used when the power supply control device 3 is controlled from the external device.

In a case where the mass spectroscope 1 does not use nitrogen gas, a flow passage of the mass spectroscope 1 is closed. In a case where a value of the pressure gauge 8a is less than a predetermined value, when the power supply is turned on, the CPU 10f turns on the power supply switch 9c. When the power supply switch 9c is turned on, power supply to the power supply circuit 4l of the compressed air generator 4 is started. As a result, the compressor 4c operates.

Thereafter, when the compressor 4c operates, nitrogen gas is stored in the nitrogen gas tank 6c. As a result, the value of the pressure gauge 8a becomes not less than the predetermined value. At this time, the CPU 10f turns off the power supply switch 9c. When the power supply switch 9c is turned off, the supply of power to the power supply circuit 4l of the compressed air generator 4 is shut off. As a result, the compressor 4c stops.

Thereafter, the CPU 10f controls the power supply switch 9c on the basis of the value of the pressure gauge 8a. The compressor 4c is brought into an operating state or a stop state on the basis of the state of the power supply switch 9c. As a result, the value of the pressure inside the pipe 6a is within a prescribed range.

In this state, when the mass spectroscope 1 uses nitrogen gas, the flowmeter 8b detects the flow of the nitrogen gas. In a case where nitrogen gas is supplied to the mass spectroscope 1 after waiting until a value of the pressure of the nitrogen gas rises up to a predetermined value, the CPU 10f closes the control valve 7a just after the flowmeter 8b detects the flow of the nitrogen gas. Thereafter, when the value of the pressure gauge 8a becomes the predetermined value, the CPU 10f opens the control valve 7a.

While the flowmeter 8b detects the flow of the nitrogen gas, the CPU 10f maintains an on state of the power supply switch 9c. When the power supply switch 9c maintains the on state of the power supply switch 9c, the supply of power to the power supply circuit 4l of the compressed air generator 4 is maintained. As a result, the compressor 4c maintains the operating state.

Thereafter, when the mass spectroscope 1 does not use nitrogen gas, the flowmeter 8b does not detect the flow rate of the nitrogen gas. In a case where the value of the pressure gauge 8a is not less than the predetermined value at this time, the CPU 10f turns off the power supply switch 9c. When the power supply switch 9c is turned off, the supply of power to the power supply circuit 4l of the compressed air generator 4 is shut off. As a result, the compressor 4c stops.

When the compressor 4c stops, the CPU 10f causes the reducing valve 7b to forcibly exhaust the nitrogen gas inside the pipe from the nitrogen gas generator 2 to the nitrogen gas inlet. As a result, the pressure inside the pipe from the nitrogen gas generator 2 to the nitrogen gas inlet lowers.

The CPU 10f causes the recording memory 10e to record information of the power supply of the power supply control device 3, the operation of the mode switch 10a, the state of the power supply switch 9c, the detecting condition of the pressure gauge, and the detecting condition of the flowmeter. At this time, the CPU 10f causes the recording memory 10e to associate the information with information of date and time based on the date timer 10b to record the associated information.

Now, a summary of operation of the power supply control device 3 will be described with reference to FIG. 4.

Figure 4:
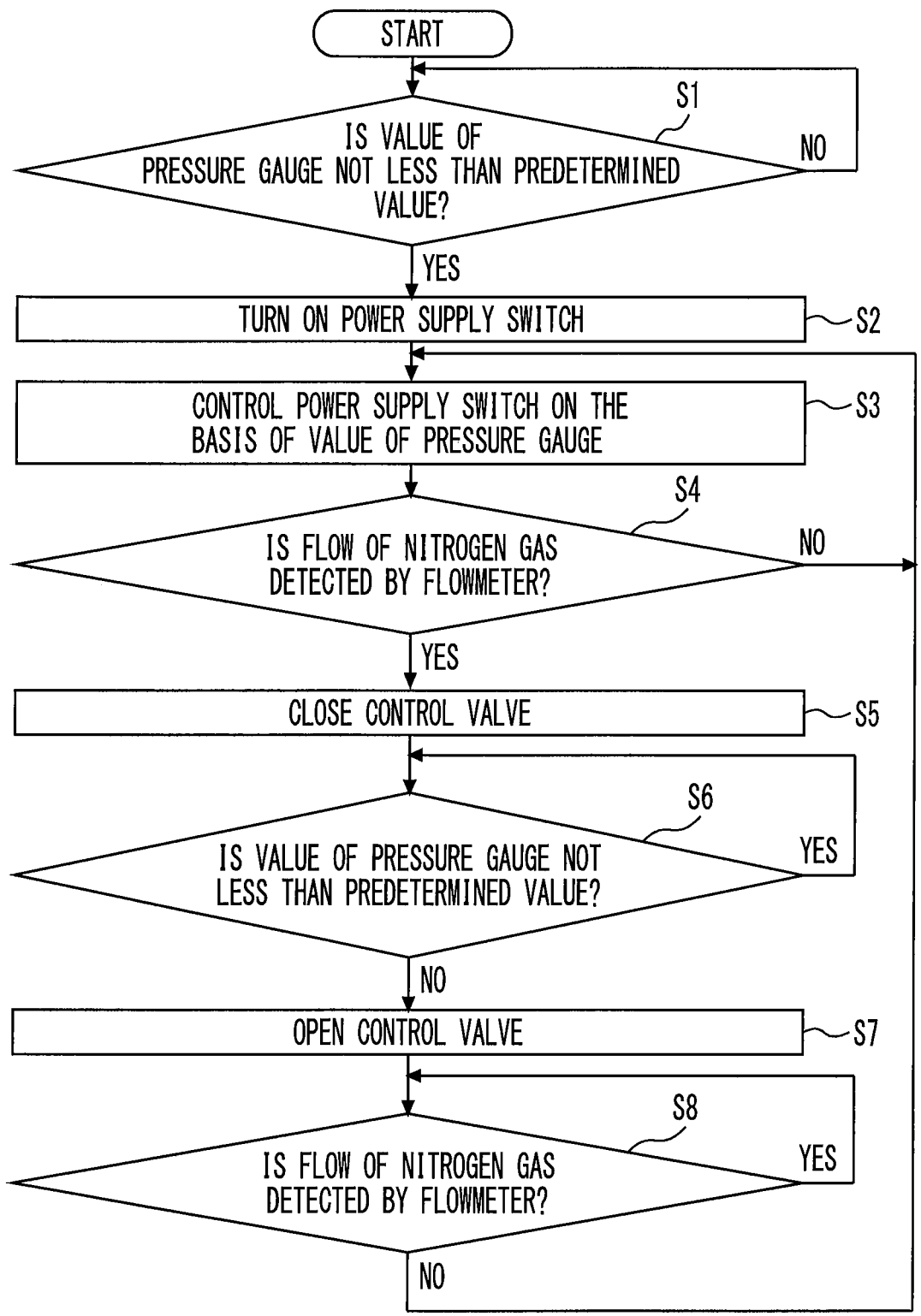
FIG. 4 is a flowchart for illustrating a summary of operation of the power supply control device of a nitrogen gas generator according to Embodiment 1 of the present invention.

FIG. 4 is a flowchart for illustrating operation of the power supply control device of a nitrogen gas generator according to Embodiment 1 of the present invention.

In Step S1, the CPU 10*f* determines whether or not the value of the pressure gauge 8*a* is less than the predetermined value. In a case where the value of the pressure gauge 8*a* is not less than the predetermined value in Step S1, Step S1 is repeated. In a case where the value of the pressure gauge 8*a* is less than the predetermined value in Step S1, the process advances to Step S2.

In Step S2, the CPU 10*f* turns on the power supply switch 9*c*. Thereafter, the process advances to Step S3. In Step S3, the CPU 10*f* controls the power supply switch 9*c* on the basis of the value of the pressure gauge 8*a*. Thereafter, the process advances to Step S4. In Step S4, the CPU 10*f* determines whether or not the flowmeter 8*b* detects the flow of nitrogen gas.

In a case where the flowmeter 8*b* does not detect the flow of nitrogen gas in Step S4, the process returns to Step S3. In a case where the flowmeter 8*b* detects the flow of nitrogen gas in Step S4, the process advances Step S5. In Step S5, the CPU 10*f* closes the control valve 7*a*. Thereafter, the process advances to Step S6. In Step S6, the CPU 10*f* determines whether or not the value of the pressure gauge 8*a* is less than the predetermined value.

In a case where the value of the pressure gauge 8*a* is less than the predetermined value in Step S6, Step S6 is repeated. In a case where the value of the pressure gauge 8*a* is not less than the predetermined value in Step S6, the process advances to Step S7. In Step S7, the CPU 10*f* opens the control valve 7*a*. Thereafter, the process advances to Step S8.

In Step S8, the CPU 10*f* determines whether or not the flowmeter 8*b* detects the flow of nitrogen gas. In a case where the flowmeter 8*b* detects the flow of the nitrogen gas in Step S8, Step S8 is repeated. In a case where the flowmeter 8*b* does not detect the flow of the nitrogen gas in Step S8, the process returns to Step S3.

According to Embodiment 1 described above, the supply of power to the compressor 4*c* and shut-off of the supply of power are controlled in accordance with the measurement result of at least one of the pressure gauge 8*a* and the flowmeter 8*b*. More specifically, the supply of power to the nitrogen gas generator 2 and the shut-off of the supply of power are controlled in accordance with the measurement result of at least one of the pressure gauge 8*a* and the flowmeter 8*b* is controlled. Therefore, it is possible to save the operating time of the compressor 4*c*. It is possible to prolong time until the maintenance of the compressor 4*c* is required.

For example, in a case where the value of the pressure measured by the pressure gauge 8*a* when the flow of nitrogen gas is not detected on the basis of the flow rate measured by the flowmeter 8*b* is less than the predetermined value, the supply of power to the compressor 4*c* only needs to be maintained. For example, in a case where the value of the pressure measured by the pressure gauge 8*a* is not less than the predetermined value when the flow of nitrogen gas is not detected on the basis of the flow rate measured by the flowmeter 8*b*, the supply of power to the compressor 4*c* only needs to be shut off. In this case, the value of the pressure inside the pipe 6*a* can be within the prescribed range.

For example, in a case where the flow of nitrogen gas is detected on the basis of the flow rate measured by the flowmeter 8*b*, the supply of power to the compressor 4*c* only needs to be maintained. For example, in a case where the flow of nitrogen gas is not detected on the basis of the flow rate measured by the flowmeter 8*b*, the supply of power to the compressor 4*c* only needs to be shut off. In this case, it is possible to suppress waste operation of the compressor 4*c* at the time of non-use of nitrogen gas.

For example, in a case where the flow of nitrogen gas is not detected on the basis of the flow rate measured by the flowmeter 8*b*, the control valve 7*a* only needs to be opened. When a state where the flow of nitrogen gas is not detected on the basis of the flow rate measured by the flowmeter 8*b* is changed to a state where the flow of nitrogen gas is detected, the control valve 7*a* only needs to be closed. When the value of the pressure measured by the pressure gauge 8*a* reaches the predetermined value in a state where the control valve 7*a* is closed, the control valve 7*a* only needs to be opened. In this case, nitrogen gas can be supplied to the mass spectroscope 1 after waiting until the value of the pressure of nitrogen gas rises up to the predetermined value.

The pressure of the nitrogen gas inside the flow passage from the nitrogen gas generator 2 to the nitrogen gas inlet 6*b* only needs to be lowered by operating the reducing valve 7*b* after control for shutting off the supply of power to the compressor 4*c* is performed. In this case, it is possible to easily restart the operation of the compressor 4*c*.

The lowering of the pressure from the nitrogen gas tank 6*c* to the nitrogen gas outlet 6*d* is suppressed by the check valve 7*c*. Therefore, nitrogen gas can be immediately supplied to the mass spectroscope 1.

The recording memory 10*e* records the information of the operating condition of the power supply control device 3. Therefore, it is possible to estimate the operating condition of the compressor 4*c*.

Embodiment 2

Figure 5:
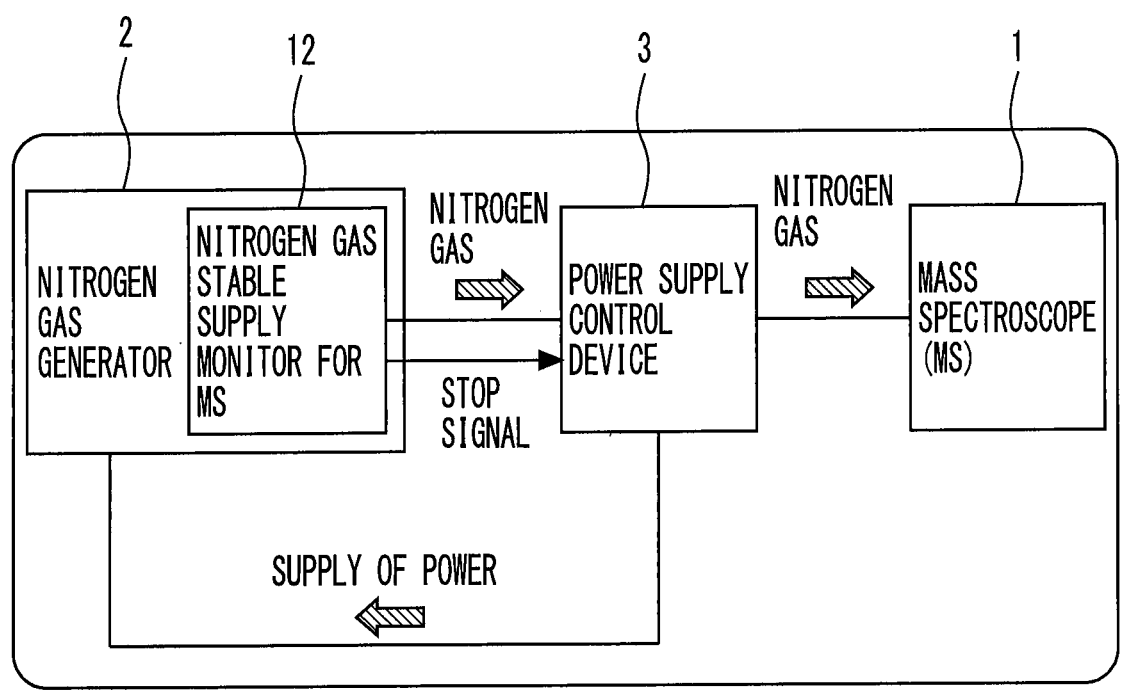
FIG. 5 is a system configuration diagram to which a power supply control device of a nitrogen gas generator according to Embodiment 2 of the present invention is applied.

FIG. 5 is a system configuration diagram to which a power supply control device of a nitrogen gas generator according to Embodiment 2 of the present invention is applied. Parts that are the same as or equivalent to the parts of Embodiment 1 are denoted by the same reference numerals. The overlapped description of the parts will be omitted.

A nitrogen gas generator 2 of Embodiment 2 is a nitrogen gas generator 2 obtained by adding a nitrogen gas stable supply monitor 12 for an MS to the nitrogen gas generator 2 of Embodiment 1. The nitrogen gas stable supply monitor 12 for an MS receives supply of external power supply.

In Embodiment 2, a power supply control device 3 shuts off supply of power to the nitrogen gas generator 2 on the basis of a stop signal from the nitrogen gas stable supply monitor 12 for an MS.

Now, the nitrogen gas stable supply monitor 12 for an MS will be described with reference to FIG. 6.

Figure 6:
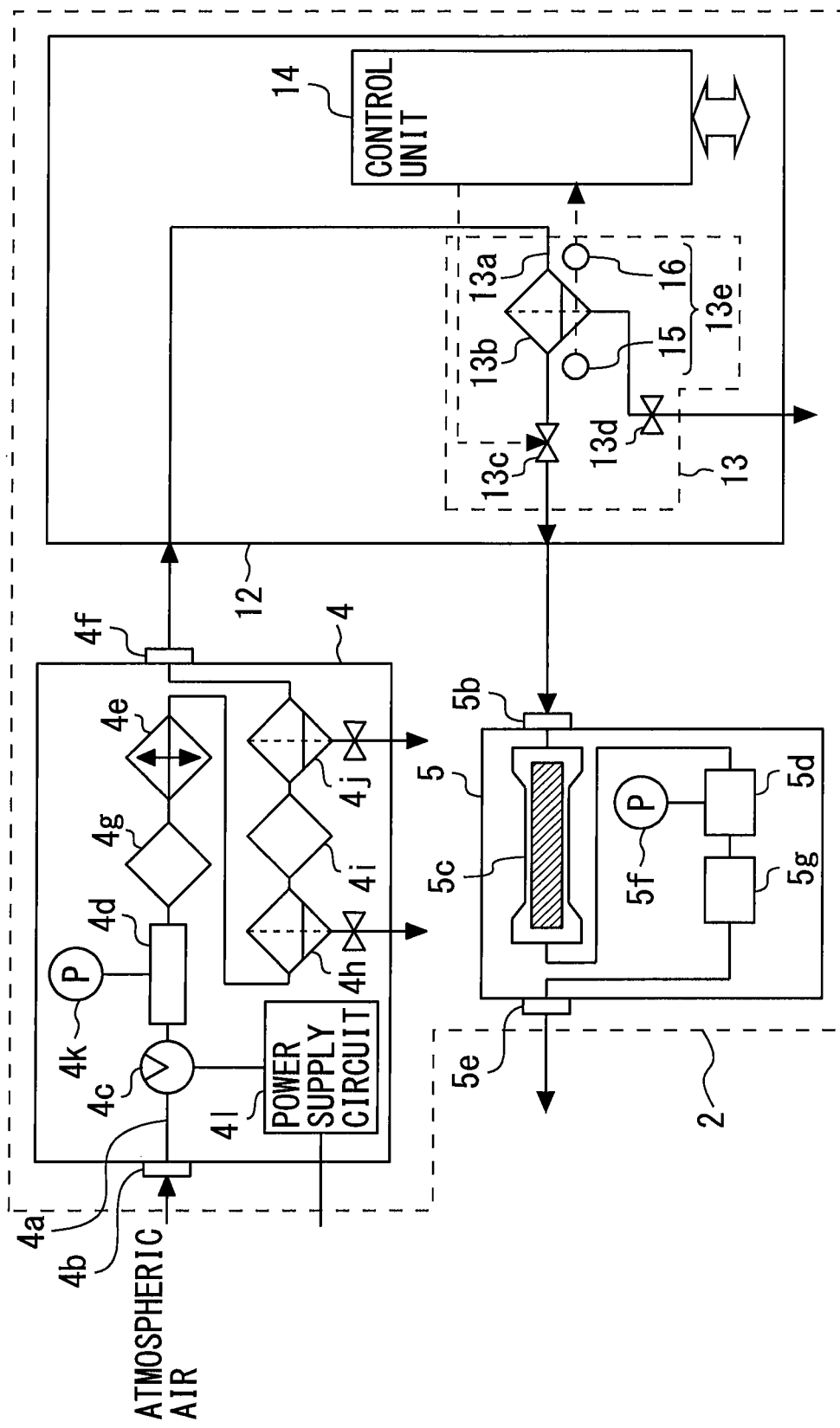
FIG. 6 is a configuration diagram of a nitrogen gas stable supply monitor of a system to which the power supply control device of a nitrogen gas generator according to Embodiment 2 of the present invention is applied.

FIG. 6 is a configuration diagram of the nitrogen gas stable supply monitor of a system to which the power supply control device of a nitrogen gas generator according to Embodiment 2 of the present invention is applied.

As illustrated in FIG. 6, the nitrogen gas stable supply monitor 12 for an MS includes a gas stable supply unit 13 and a control unit 14.

The gas stable supply unit 13 includes a pipe 13*a*, a water filter 13*b*, a shut-off valve 13*c*, a drain water lid 13*d*, and a water sensor 13*e*.

The pipe 13*a* connects a compressed air outlet 4*f* of a compressed air generator 4 to a compressed air inlet 5*b* of a nitrogen gas separator 5. The water filter 13*b* is provided on a flow passage of the pipe 13*a*. The shut-off valve 13*c* is provided on a flow passage of the pipe 13*a* on the downstream side with respect to the water filter 13*b*. The drain water lid 13*d* is connected to the water filter 13*b*. The water sensor 13*e* is provided in the water filter 13*b*.

The water filter 13b filters water. The shut-off valve 13c controls the flow of compressed air inside the pipe 13a. The drain water lid 13d controls exhaust of the water filtered by the water filter 13b. The water sensor 13e detects the water filtered by the water filter 13b.

In a structure and a detection method of the water sensor 13e, many variations are assumed. In this Embodiment, a photodetector is utilized as the water sensor 13e. For example, the photodetector includes a light emitting part 15 composed of a photo diode and the like, and a light detection unit (photodetector) 16. The light detection unit 16 receives light that penetrates the water filter 13b from the light emitting part 15. The water sensor 13e of an optical system utilizes a difference of the degree of absorption of light in accordance with a moisture content to detect the presence or absence of moisture, and the moisture content on the basis of the light receiving intensity of the light detection unit 16, and the like.

For example, a water sensor of an electric system measures change of electrical resistivity, or change of electric capacity in accordance of the moisture content, so that the presence or absence of moisture, and the moisture content is detected. In a case where a large sensor can be installed, a microwave moisture meter or the like may be utilized as the water sensor 13e. The water sensor 13e of any of the systems only needs to detect whether or not the water amount of the inside the water filter 13b reaches a predetermined amount.

Also in a mounting position of the shut-off valve 13c, many variations are assumed. For example, the shut-off valve 13c may be provided at any arbitrary portion on the way of the flow passage for nitrogen gas. For example, the shut-off valve 13c may be provided on the downstream side with respect to the nitrogen gas outlet 5e.

In a case where the water amount inside the water filter 13b reaches the predetermined amount, the control unit 14 closes the shut-off valve 13c. As a result, the flow of nitrogen gas is shut off. At this time, the control unit 14 outputs a stop signal toward a signal input unit of the power supply control device 3.

According to Embodiment 2 described above, the supply of power to the compressor 4c is shut off on the basis of a stop signal from the outside. More specifically, the supply of power to the compressor 4c is shut-off on the basis of the stop signal from the nitrogen gas stable supply monitor 12 for an MS. Therefore, the supply of power to the compressor 4c can be shut off as needed.

Now, a modification of the nitrogen gas stable supply monitor will be described with reference to FIG. 7.

Figure 7:
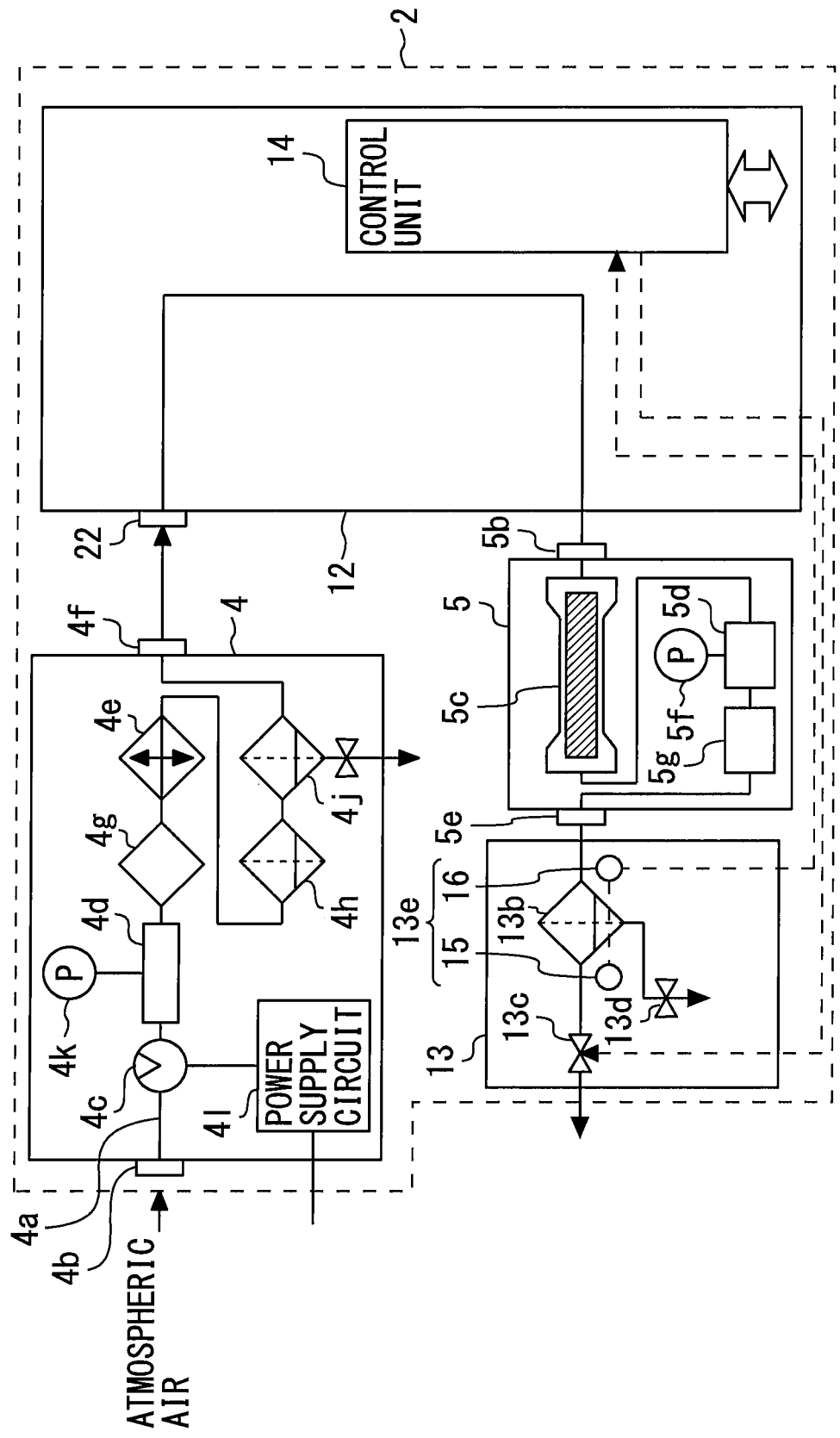
FIG. 7 is a configuration diagram of a modification of the nitrogen gas stable supply monitor of a system to which the power supply control device of a nitrogen gas generator according to Embodiment 2 of the present invention is applied.

FIG. 7 is a configuration diagram of a modification of the nitrogen gas stable supply monitor of a system to which the power supply control device of the nitrogen gas generator according to Embodiment 2 of the present invention is applied.

As illustrated in FIG. 7, a gas stable supply unit 13 may be provided on a downstream side with respect to a nitrogen gas separator 5. Also in this case, the supply of power to the compressor 4c can be shut off as needed.

INDUSTRIAL APPLICABILITY

As described above, the power supply control device of a nitrogen gas generator according to the present invention can be utilized in a system of shutting off the supply of power to a compressor.

REFERENCE SIGNS LIST

1 Mass spectroscope
2 Nitrogen gas generator
3 Power supply control device
4 Compressed air generator
4a Pipe
4b Atmospheric air inlet
4c Compressor
4d Air tank
4e Gas cooler
4f Compressed air outlet
4g First air filter
4h Second air filter
4i Activated carbon filter
4j Micromist filter
4k Pressure sensor
4l Power supply circuit
5 Nitrogen gas separator
5a Pipe
5b Compressed air inlet
5c Nitrogen separation film
5d Nitrogen gas regulator
5e Nitrogen gas outlet
5f Pressure gauge
5g Flowmeter
6a Pipe
6b Nitrogen gas inlet
6c Nitrogen gas tank
6d Nitrogen gas outlet
7a Control valve
7b Reducing valve
7c Check valve
8a Pressure gauge
8b Flowmeter
9a Power supply input unit
9b Power supply output unit
9c Power supply switch
10a Mode switch
10b Date timer
10c Indicator
10d Buzzer
10e Recording memory
10f CPU
11a External signal input unit
11b External signal output unit
11c External communication unit
12 Nitrogen gas stable supply monitor for MS
13 Gas stable supply unit
13a Pipe
13b Water filter
13c. Shut-off valve
13d Drain water lid
13e Water sensor
14 Control unit
15 Light emitting part
16 Light detection unit

The invention claimed is:

1. A power supply control device for a nitrogen gas generator that compresses air by a compressor to separate a nitrogen gas from air, the power supply control device comprising:
   a pipe having: (a) a nitrogen gas inlet configured to receive a nitrogen gas from the nitrogen gas generator, and (b) a nitrogen gas outlet configured to output the nitrogen gas received by the nitrogen gas inlet outside the power supply control device;
   a control valve provided on a flow passage of the pipe between the nitrogen gas inlet and the nitrogen gas outlet;

a pressure gauge configured to measure a pressure inside the pipe between the nitrogen gas inlet and the control valve;

a flowmeter configured to measure a flow rate of the nitrogen gas flowing inside the pipe between the nitrogen gas inlet and the control valve; and a processor programmed to:
control an amount of power supplied to the compressor and shutting off the supply of the power in accordance with a measurement result of at least one of the pressure gauge and the flowmeter, and open the control valve in a case where a flow of the nitrogen gas inside the pipe is not detected based on the flow rate measured by the flowmeter.

2. The power supply control device according to claim 1, further comprising:
a nitrogen gas tank provided between the nitrogen gas inlet and the nitrogen gas outlet, wherein the processor controls the supply of power to the compressor and the shut-off of the supply of the power to the compressor by controlling supply of power to the nitrogen gas generator and shut-off of the supply of the power to the nitrogen gas generator based on at least one of the measured pressure or the measured flow rate.

3. The power supply control device according to claim 1, wherein
the processor is further programmed to:
maintain the supply of the power to the compressor in a case where the measured pressure is less than a predetermined value when flow of the nitrogen gas is not detected based on the measured flow rate, and shut off the supply of the power to the compressor in a case where the measured pressure is not less than the predetermined value when the flow of the nitrogen gas is not detected based on the measured flow rate.

4. The power supply control device according to claim 1, wherein
the processor is further programmed to:
maintain the supply of the power to the compressor in a case where the flow of the nitrogen gas is detected based on the measured flow rate, and shut off the supply of the power to the compressor in a case where the flow of the nitrogen gas is not detected based on the measured flow rate.

5. The power supply control device according to claim 1, wherein
the processor is further programmed to:
open the control valve in a case where flow of the nitrogen gas is not detected based on the measured flow rate, close the control valve when a first state where the flow of the nitrogen gas is not detected is changed to a second state where the flow of the nitrogen gas is detected, and open the control valve when the measured value of the pressure reaches a predetermined value while the control valve is closed.

6. The power supply control device according to claim 5, further comprising:
a reducing valve provided on a flow passage of the pipe on a side of the nitrogen gas inlet with respect to the control valve, wherein the pressure gauge measures pressure inside the pipe between the reducing valve and the control valve, the flowmeter measures a flow rate of nitrogen gas flowing between the reducing valve and the control valve, and the processor is further programmed to:
control shutting off the supply of the power to the compressor, and decrease pressure of nitrogen gas inside the flow passage from the nitrogen gas generator to the nitrogen gas inlet by operating the reducing valve.

7. The power supply control device according to claim 6, further comprising:
a nitrogen gas tank provided on a flow passage of the pipe between the reducing valve and the control valve; and a check valve provided on a flow passage of the pipe between the reducing valve and the nitrogen gas tank, the check valve being configured to suppress a decrease of pressure from the nitrogen gas tank to the nitrogen gas outlet.

8. The power supply control device according to claim 1, wherein
the processor is further programmed to control shut off of the supply of the power to the compressor based on a stop signal transmitted from outside the power supply control device.

9. The power supply control device according to claim 8, wherein
the processor stops the nitrogen gas generator in response to a stop signal that is output when a nitrogen gas stable supply monitor shuts off flow of the nitrogen gas.

10. The power supply control device according to claim 1, further comprising:
a memory that stores information on an operating condition of the power supply control device.

* * * * *